Aug. 15, 1939.   H. (JOHANN KONRAD) WAGNER ET AL   2,169,308

DIVIDING MACHINE AND THE LIKE

Filed Oct. 2, 1937

Inventors:
Hans (Johann Konrad) Wagner
Hans Joachim Sommer
By A. H. Weller
Attorney Patented Aug. 15, 1939

2,169,308

UNITED STATES PATENT OFFICE 2,169,308

DIVIDING MACHINE AND THE LIKE

Hans (Johann Konrad) Wagner and Hans-Joachim Sommer, Oberfranken, Germany

Application October 2, 1937, Serial No. 167,074
In Germany October 6, 1936

10 Claims. (Cl. 33—19)

The graduation marks on dial plates and the like are usually engraved by fixing the workpiece on a support which is rotatably mounted underneath the graving tools, the support being moved through a distance corresponding to the graduation of the scale and then stopped, whereupon the graving tools come into operation. At the end of the working stroke, the tools are raised out of contact with the workpiece which is again moved through one degree of the scale, after which the same working operation is repeated.

It has now transpired that, especially in the case of unequal graduations, for which a high degree of precision is required, the desired result cannot be directly achieved by purely mechanical means. Even slight wear or fouling of the spacing devices of a mechanical control device cause differences in the movement of the workpiece, which lead to inaccuracies in graving the individual graduation marks.

According to this invention, the defects of the mechanical control devices are remedied by controlling the movement of the workpiece by light-ray scanning through a templet in positive connection with the arrangement which moves the workpiece. Through the agency of a photoelectric cell, the light ray influences a relay or the like which controls the arrangement actuating the workpiece. To stop the movement for example, the arrangement may be such that, under the influence of the ray, the relay disengages a clutch driving the spindle of the device supporting the work. In a similar manner, the ray may replace a clutch for controlling the switch of the motor driving said spindle. The reengagement of the clutch, or the switching on of the motor driving said spindle, may be effected, for example, by means of a mechanical or electrical connection with the drive actuating the work. Alternatively, a screen or a second templet, may be provided which also enables the motor to be switched on, or the clutch let in, by means of a light ray. Details of the special embodiment of the arrangement are set out in the following description.

Some typical embodiments of the subject of the invention are diagrammatically illustrated in the drawing as applied to a circle dividing machine.

Figure 1:
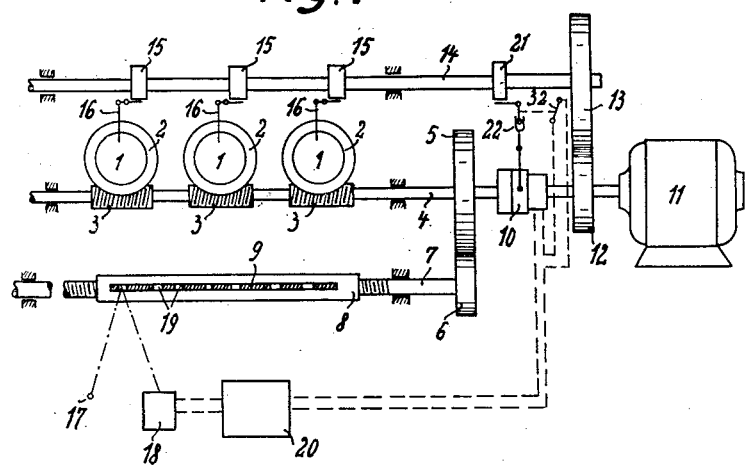
Figure 1 is an arrangement controlled by a templet, mounted on a support and scanned with a light ray.

According to Figure 1, the dial plates 1 to be graduated are mounted on rotatable supports, each of which is integrally formed with a worm gear 2. These worm gears are engaged by worms 3 provided on shaft 4. The shaft 4 is positively connected through a pair of spur gears 5, 6 with a second shaft 7 carrying a support 8 on which is arranged a templet 9 provided on an enlarged scale, if desired, with the graduation to be reproduced. Shaft 7 is provided with a threaded portion coacting with a corresponding threaded portion of support 8 so that rotation of shaft 7 will cause linear displacement of the support and of templet 9 arranged thereon. In addition, means (not shown) are provided to prevent rotation of support 8 with shaft 7.

The shafts 4 and 7 are driven by a motor 11 through a clutch 10. Interposed between the motor 11 and the clutch 10 is a transmission gear 12, 13 serving to drive a shaft 14 which actuates the cutting tools 16 through the agency of cams 15.

Rotating the spindle 4 actuates both the workpieces 1 through worms 3 and worm gears 2 and the templet 9. The templet 9 through gears 5 and 6, threaded spindle 7 and support 8 is scanned by a light ray emitted by the source of light 17 and reaching the photoelectric cell 18 after reflection on the templet 9. If, during the movement of the templet 9, its reflective capacity be modified, for example by a reflecting point 19 reflecting the ray on to the photoelectric cell 18, the light entering the cell 18 generates a current therein. The resulting current impulse acts, through an amplifier, on a relay 20 which disengages the clutch 10 in known manner, for example by magnetic means. Since this breaks the connection between the shafts 4 and 7 with the motor 11, both the workpiece 1 and the templet are stopped. The ratio of the gear 12, 13 is so determined that, in the event that the reflecting points 19 of the templet 9 are unevenly spaced, the shaft 14 describes a rotation corresponding to the widest spacing on the graduation of the templet. If, as the result of the action of the ray on the photoelectric cell 18 and the consequent disengagement of the clutch, the workpiece 1 is now stationary, the cams 15 actuate the graving tools 16 after the motor shaft has described a corresponding number of revolutions. Each of these tools engraves a graduation mark in the workpiece, and all of them are then raised out of contact with the workpieces in known manner, by any convenient control means. The rotating shaft 4 finally re-engages the clutch 10 through a control cam 21 and lever mechanism 22. After this clutch is re-engaged, the workpieces 1 and templet 9 continue to advance conjointly, until a reflecting point 19 again reflects the ray coming from the source of light 17, to the photoelectric cell 18. The above described working operation is then repeated.

The templet may also be provided with slots for the passage of the light. With such an arrangement, the source of light is located on one side of the templet, and the photoelectric control member on the other side. The templet may consist of any convenient material, for example of a metal strip provided with slits spaced in accordance with the graduation to be reproduced. It is also possible, by a suitable selection of the gear ratio of gears 5, 6 to produce very close set graduation marks on the workpiece with a more widely graduated templet. Similarly, by a suitable selection of gear ratio, the graduations produced on the workpiece could be more widely spaced than the spacing on the templet.

In place of metal, the templet, may be composed of some other suitable material. For example, a strip of film can be used, which is provided with suitably spaced translucent and opaque zones.

Figure 2:
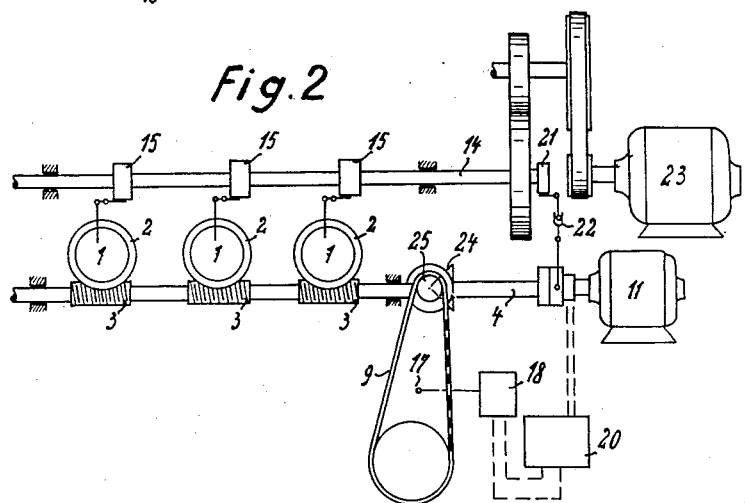
Figure 2 is a similar arrangement, in which, however, a templet of flexible material passes over two rollers.

Figure 2 represents another typical embodimen of the subject of the invention. Instead of a single motor, separate motors 11 and 23 are provided for driving the workpiece spindle 4 and the shaft 14 actuating the tools. The motor 11 drives the shaft 4 through a clutch 10 in the manner already described, said shaft in turn actuating a toothed drum 25 through cone-pinion gear 24. Over said drum runs a templet 9 of flexible material, provided with the graduation marks to be reproduced and also with slots or holes engaged by the teeth of the drum 25, in order to keep it in the correct position on the drum. As shown in this Figure 2, the templet 9 is scanned by the light ray emitted by the source of light 17, and transmits the light ray on to the photoelectric cell 18. In turn, the current generated in said cell 18 actuates the clutch 10, through a relay 20. As already described, the clutch is re-engaged by the tool shaft 14 acting through a cam 21 and the lever mechanism 22. If desired, the lever mechanism 22 may also be connected with a switch, in both the embodiments shown in Figures 1 and 2, said switch serving to break the circuit when the clutch is "in" again. During the further rotation of the shaft 14, however, the switch is turned over again, so that, when the light ray again acts on the photoelectric cell, the clutch can be again disengaged by electromagnetic action.

Figures 3, 4:
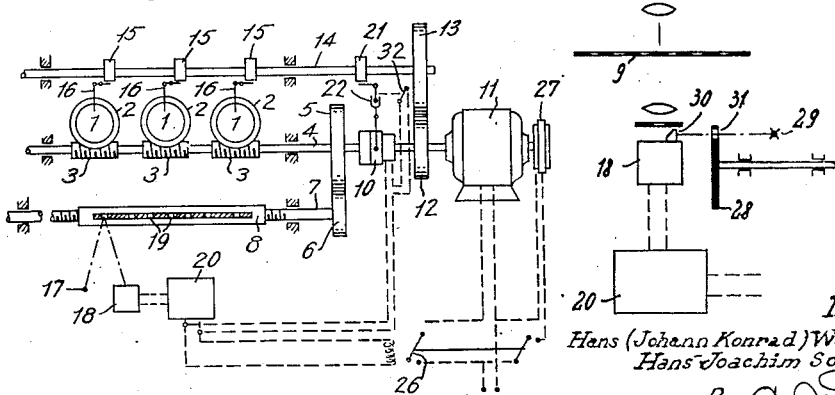
Figure 3 shows the arrangement of a motor switch controlled by a photo-electric cell.
Figure 4 shows an arrangement of the photoelectric cell, in which the resumption of movement is effected by means of a second ray and a screen.

According to Figure 3, the clutch can be replaced, in special cases, by an electric cut-out 26 for the motor 11. In such event, the current from the photoelectric cell 18 acts, through a relay 20 on said switch and thus shuts off the supply of current to the motor 11.

In order to stop the motor 11 as soon as the current is shut off, the motor shaft is fitted with a braking device 27. This is preferably actuated electrically, in such a manner that the brake blocks bear, under spring pressure, against a brake drum, or the like, when the current to the motor is shut off. It has been found specially advisable to switch the brake current on, or off, shortly before the motor current is shut off, in order to overcome the hysteresis phenomena of the brake magnet. The electromagnetic brake is released before or at the time, when the motor current is switched-in again.

In the embodiment shown in Figures 1 and 2, the tools are set in action again by a cam on the tool shaft. Such cam transmission can be replaced with advantage, by a light-scanning device. Diagrammatically represented in Figure 4 is an arrangement which, in contrast to the above described embodiments interrupts the actuation of the tool spindle when an opaque zone of the templet 9 comes into position between the source of light 11 and the photoelectric cell 18.

The actuation of the clutch and of relay 20 is so arranged that the clutch is engaged when the current is turned on, but disengages automatically, under the pressure of a spring, or like means, as soon as the current is shut off. With this arrangement, the resumption of movement of the workpieces can be effected by means of the same photoelectric cell as is employed for stopping said movement. Connected with the tool shaft 14 is a screen 28, on one side of which is a second source of light 29, whilst, on the aperture side of the photoelectric cell 18 is arranged a prism 30. If now a translucent zone 31 of the screen 28 arrives in position between the source of light 29 and the prism 30 of the photoelectric cell 18, the clutch of the tool spindle will be re-engaged. The joint movement of the tool and the templet 9 will then continue until an opaque zone of the templet 9 again comes into the path of the ray of light from the source 17. The ray is thus interrupted and the clutch is released, by spring action or the like, so that the tool and templet come to a stop. Re-engagement is effected, by means of the second source of light 29, at the instant the tool shaft 14 has turned far enough for a second translucent zone 31 of the screen 28 to be brought in front of the source of light 29.

The ray from the source of light 29 passes through slits 31 and encounters the prism, where it is refracted and led into the interior of the photoelectric cell. Through the resulting current impulse the workpiece shaft is re-engaged, so that the templet 9 and workpiece advance as already described.

As mentioned above, the ratio of the gear 12, 13 for actuating the tool shaft must be so selected that the working strokes of the tools 16 take place at time intervals which correspond to the maximum spacing of the slits 19 in the templet 9. Accordingly, in the case of unequal graduations, the tool shaft 14 idles for a certain time in the zones of finer graduation. To avoid such idling, the device can, if desired, be so arranged that the tool shaft 14 is controlled, in subordination to the workpiece shaft 4 or to the shaft 7 actuating the templet 9. To accomplish this result, the single-acting clutch 10 may be replaced by a double-acting clutch, so that the drive of the shaft 14 is put into operation each time the shaft 4 is disconnected. Then, in the manner already described, the control cam 21 re-engages the clutch 10, to actuate the shafts 4 and 7, at the end of each working stroke of the tools 16. When two separate motors are employed for driving the shafts 4 and 14, a separate clutch can be arranged in the drive of the shaft 14, which clutch, in conjunction with the clutch 10 of the workpiece shaft produces the same effect as that described for a double-acting clutch.

If graduations are to be inscribed on measuring rules or the like, instead of on dial plates, all that is necessary is to replace rotatable supports 2 by longitudinally movable supports, which are driven by shaft 4.

What we claim is—

1. In an apparatus for providing graduation marks on workpieces in accordance with corresponding divisions of a templet, the combination comprising means for intermittently and simultaneously displacing a workpiece and a templet, said templet bearing visible marks thereon, marking means adapted to provide marks on said workpiece when actuated, means for driving said displacing and said marking means, and photoelectric scanning means actuable by the visible marks of said templet to operate said displacing and said marking means in predetermined time relationship to cause graduation of said workpiece.

2. In an apparatus for providing graduation marks on workpieces in accordance with corresponding divisions of a templet, the combination comprising means for intermittently and simultaneously displacing a workpiece and a templet, said templet bearing visible marks thereon, marking means adapted to provide marks on said workpiece when actuated, means for driving said displacing and said marking means, and photoelectric scanning means actuable by the visible marks of said templet to operate said displacing and said marking means in predetermined time relationship to cause graduation of said workpiece, said scanning means including a light ray directed onto the marks of said templet and a photoelectric cell and a relay.

3. In an apparatus for providing graduation marks on workpieces in accordance with corresponding divisions of a templet, the combination comprising means for intermittently and simultaneously displacing a workpiece and a templet bearing visible marks thereon, marking means adapted to provide marks on said workpiece when actuated, means for driving said displacing and said marking means in predetermined time relationship, means for projecting a ray of light onto the marks of said templet, a photoelectric cell influenced by said ray modified by said marks, and means actuated by said photoelectric cell to render said driving means temporarily inoperative during graduation of said workpiece by said marking means.

4. In an apparatus for providing graduation marks on workpieces in accordance with corresponding divisions of a templet, the combination comprising means for intermittently and simultaneously displacing a workpiece and a templet bearing visible marks thereon, marking means adapted to provide marks on said workpiece when actuated, means for driving said displacing and said marking means in predetermined time relationship, means for projecting a ray of light onto the marks of said templet, a photoelectric cell influenced by said ray modified by said marks, and a clutch actuated by said photoelectric cell to render said driving means temporarily inoperative during the time when said marking means are actuated whereby graduation marks are provided on said workpiece by said marking means.

5. In an apparatus for providing graduation marks on workpieces, the combination comprising means including a rotatable displacing shaft for intermittently and simultaneously displacing a workpiece and a templet, said templet bearing visible marks thereon corresponding to the desired graduation, marking means including a tool shaft adapted to provide marks on said workpiece when actuated, a driving motor for said displacing shaft and for said tool shaft, photoelectric means actuable by said visible marks in a predetermined position thereof adapted to interrupt the circuit of said displacing shaft motor, and brake means automatically engaging said motor when its circuit is interrupted.

6. In an apparatus for providing graduation marks on workpieces, the combination comprising means including a workpiece spindle for intermittently displacing a workpiece and a templet, said templet bearing visible marks thereon corresponding to the graduations desired on the workpiece, marking means including graving tools and a tool drive capable of providing marks on said workpiece when actuated, a driving motor for said spindle, a second driving motor for said tool drive, a clutch interposed between said spindle and said first driving motor, photoelectric means including a light ray and a photoelectric cell and a relay actuable by said visible marks on said templet in predetermined positions thereof to disengage said clutch, and means actuated by said tool drive to cause reengagement of said clutch upon completion of the working stroke of the graving tools.

7. In an apparatus for providing graduation marks on workpieces, the combination comprising means including a workpiece spindle for intermittently displacing a workpiece and a templet, said templet bearing visible marks thereon corresponding to the graduations desired on the workpiece and being displaced at a different rate than said workpiece, marking means including graving tools and a tool drive for marking said workpiece, a motor for driving said spindle and said tool drive, a clutch interposed between said motor and said spindle, photoelectric means including a photoelectric cell actuated by said visible marks on said templet in predetermined positions thereof to disengage said clutch, and means actuated by said tool drive to cause reengagement of said clutch upon completion of the working stroke of the graving tools.

8. In an apparatus for providing graduation marks on workpieces, the combination comprising means including a workpiece spindle for intermittently displacing a workpiece and a templet, said templet being constituted of a strip of solid material in which slits for the passage of light are spacedly provided in accordance with the graduation to be reproduced, marking means including graving tools and a tool drive for marking said workpiece, a motor for driving said spindle, a clutch interposed between said motor and said spindle, means for projecting a light ray onto the slits of said templet, photoelectric means actuated by said light ray in predetermined positions of said templet to disengage said clutch, and means actuated by said tool drive to cause reengagement of said clutch upon completion of the working stroke of the graving tools.

9. In an apparatus for providing graduation marks on workpieces, the combination comprising means including a workpiece spindle for intermittently displacing a workpiece and a templet, said templet being constituted of a strip of transparent material having translucent and opaque zones spacedly provided therein in accordance with the graduations to be reproduced, marking means including graving tools and a tool drive for marking said workpiece, a motor for driving said spindle, a clutch interposed between said motor and said spindle, means for projecting a light ray onto said transparent and opaque zones of the templet, photoelectric means actuated by said light ray in predetermined positions of said templet to disengage said clutch, and means actuated by said tool drive to cause reengagement of said clutch upon completion of the working stroke of the graving tools.

10. In an apparatus for providing graduation marks on a workpiece, the combination comprising means including a workpiece spindle for intermittently displacing a workpiece, a templet constituted of an endless strip of flexible material having zones permeable and impermeable to light spacedly provided therein in accordance with the graduation to be reproduced, means for displacing said templet in accordance with the displacement of said workpiece, marking means including graving tools and a tool drive for marking said workpiece, a motor for driving said spindle, a clutch interposed between said motor and said spindle, means for projecting a light ray onto said templet, photoelectric means actuated by said light ray in predetermined positions of said templet to disengage said clutch, and means actuated by said tool drive to cause reengagement of said clutch upon completion of the working stroke of the graving tools.

HANS (JOHANN KONRAD) WAGNER.
HANS-JOACHIM SOMMER.